(12) United States Patent
Ljungberg

(10) Patent No.: US 7,805,591 B2
(45) Date of Patent: Sep. 28, 2010

(54) METHOD AND SYSTEM FOR DUAL-CORE PROCESSING

(75) Inventor: Per Ljungberg, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1589 days.

(21) Appl. No.: 11/062,387

(22) Filed: Feb. 22, 2005

(65) Prior Publication Data

US 2005/0210220 A1 Sep. 22, 2005

Related U.S. Application Data

(60) Provisional application No. 60/549,663, filed on Mar. 3, 2004.

(51) Int. Cl.
*G06F 15/76* (2006.01)
*G06F 15/80* (2006.01)

(52) U.S. Cl. .............. 712/35; 712/30; 712/32; 712/34; 370/345; 370/347

(58) Field of Classification Search .......... 712/21, 712/28, 30, 31, 32, 34; 370/345, 347
See application file for complete search history.

(56) References Cited

U.S. PATENT DOCUMENTS

| | | | | |
|---|---|---|---|---|
| 4,852,090 A * | 7/1989 | Borth | ............. | 370/347 |
| 5,251,208 A * | 10/1993 | Canniff et al. | ............. | 370/438 |
| 5,357,511 A * | 10/1994 | DiNapoli et al. | ............. | 370/263 |
| 5,436,900 A * | 7/1995 | Hammar et al. | ............. | 370/336 |
| 5,497,373 A * | 3/1996 | Hulen et al. | ............. | 370/259 |
| 5,592,480 A * | 1/1997 | Carney et al. | ............. | 370/347 |
| 5,715,246 A | 2/1998 | Abdesselem et al. | | |
| 5,734,699 A * | 3/1998 | Lu et al. | ............. | 455/422.1 |
| 5,734,979 A * | 3/1998 | Lu et al. | ............. | 455/445 |
| 5,771,232 A * | 6/1998 | Sinibaldi et al. | ............. | 370/384 |
| 5,790,527 A * | 8/1998 | Janky et al. | ............. | 370/330 |
| 5,790,817 A | 8/1998 | Asghar et al. | | |
| 5,999,813 A * | 12/1999 | Lu et al. | ............. | 455/435.2 |
| 6,173,177 B1 * | 1/2001 | Lu et al. | ............. | 455/445 |
| 6,212,395 B1 * | 4/2001 | Lu et al. | ............. | 455/463 |
| 6,597,912 B1 * | 7/2003 | Lu et al. | ............. | 455/445 |
| 6,640,108 B2 * | 10/2003 | Lu et al. | ............. | 455/463 |
| 6,650,696 B1 * | 11/2003 | Lin et al. | ............. | 375/219 |
| 6,931,022 B1 * | 8/2005 | Sanders et al. | ............. | 370/442 |
| 7,330,900 B2 * | 2/2008 | Burger et al. | ............. | 709/231 |
| 2002/0009991 A1 * | 1/2002 | Lu et al. | ............. | 455/422 |

(Continued)

FOREIGN PATENT DOCUMENTS

EP    1 213 648 A    6/2002

(Continued)

OTHER PUBLICATIONS

Wikipedia www.Wikipedia.org search terms: CDMA, WCDMA, PDC.*

(Continued)

*Primary Examiner*—Aimee J Li

(57) ABSTRACT

This invention describes a baseband dual-core signal processing in mobile communication systems operating according to GSM, GPRS, or EDGE comprising a first digital signal processor adapted to perform tasks on a first time basis and a second digital signal processor adapted to perform tasks on a second time basis. The second time basis is an integer multiple of the first time basis.

31 Claims, 2 Drawing Sheets

U.S. PATENT DOCUMENTS

2002/0141441 A1 10/2002 Neumann et al.
2002/0168018 A1 11/2002 Scheuermann

FOREIGN PATENT DOCUMENTS

EP 1365312 11/2003
WO WO 98/14023 4/1998

OTHER PUBLICATIONS

Wikipedia www.wikipedia.org Search terms: GSM and EDGE © Feb. 2004.*

Hennessy, John L. and Patterson, David A. "Computer Architecture: A Quantitative Approach". Third Edition. New York: Morgan Kaufmann Publishers, © 2003. pp. 6-8 and 99-101.*

Becker et al.; "A second generation GSM mobile phone: ASIC-less design with two standard processors"; Proceedings of 5th Nordic Seminar on Digital Mobile Radio Communications DMR V; 1992; pp. 273-278. (Abstract only).

Redmond et al.; "A GSM/GPRS mixed-signal baseband IC"; CONF—2002 IEEE International Solid-State Circuits Conference. Digest of Technical Papers Feb. 3-7, 2002; 3 pages vol. 1.

* cited by examiner

METHOD AND SYSTEM FOR DUAL-CORE PROCESSING

CROSS-REFERENCE TO RELATED APPLICATIONS

This patent application claims priority from, and incorporates by reference the entire disclosure of, U.S. Provisional Patent Application No. 60/549,663, filed on Mar. 3, 2004.

BACKGROUND OF THE INVENTION

1. Technical Field

The present invention relates generally to baseband signal processing in mobile communication systems and, more particularly, but not by way of limitation, to a dual-core signal-processing approach for use in mobile terminals operating according to GSM, GPRS, or EDGE.

2. History of Related Art

In baseband signal processing for, for example, Global System for Mobile communications (GSM), General Packet Radio Service (GPRS), or Enhanced Data for GSM Evolution (EDGE) systems, there are numerous ways to implement the necessary signal-processing functionality. Different implementations are often measured with respect to four parameters: 1) cost (e.g., silicon size of the implementation); 2) performance (e.g., quality of employed algorithms); 3) flexibility (e.g., ability to upgrade and improve system functionality); and 4) current consumption, particularly in idle mode. A system that excels in all parameters would be very attractive for implementation.

SUMMARY OF THE INVENTION

A processing system includes a first digital signal processor adapted to perform tasks on a first time basis and a second digital signal processor adapted to perform tasks on a second time basis. The second time basis is an integer multiple of the first time basis.

In a system including a plurality of digital signal processors, a processing method includes performing, by a first digital signal processor, of tasks on a first time basis and performing, by a second digital signal processor, of tasks on a second time basis. The second time basis is an integer multiple of the first time basis.

BRIEF DESCRIPTION OF THE DRAWINGS

A more complete understanding of the present invention may be obtained by reference to the following Detailed Description of Illustrative Embodiments of the Invention, when taken in conjunction with the accompanying Drawing, wherein.

DETAILED DESCRIPTION OF ILLUSTRATIVE EMBODIMENTS OF THE INVENTION

Figure 1:
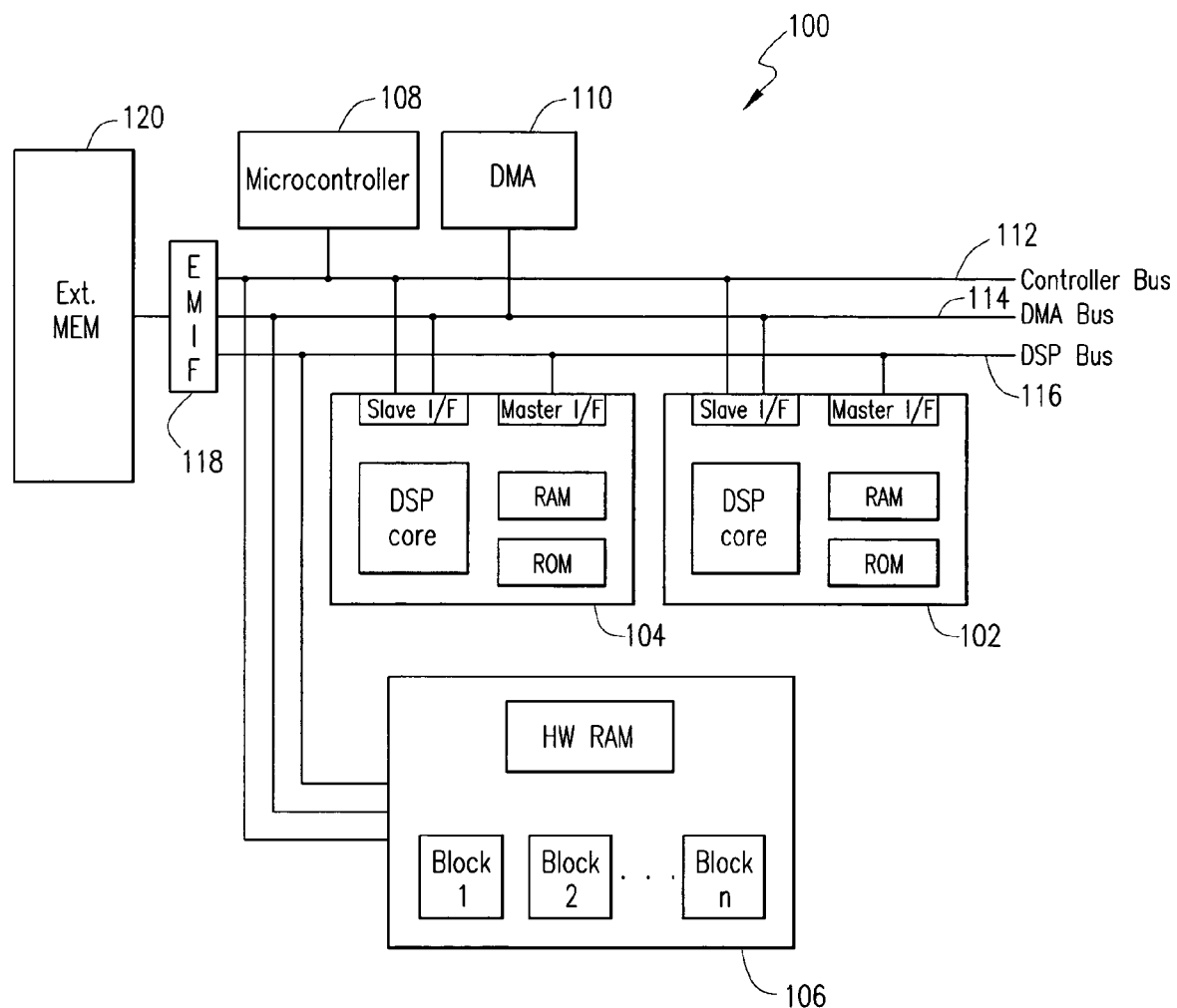
FIG. 1 is a dual-core (e.g., dual-DSP) system in accordance with principles of the invention.

Embodiment(s) of the invention will now be described more fully with reference to the accompanying Drawings. Various embodiments are described below with respect to a GSM/GPRS/EDGE implementation. The invention may, however, be embodied in many different forms, including any implementation in which a plurality of time bases are used, such as, for example, wideband code division multiple access (WCDMA), CDMA-2000, personal digital cellular (PDC), time division multiple access (TDMA), or IS-95. The invention should not be construed as limited to the embodiment(s) set forth herein. The invention should only be considered limited by the claims as they now exist and the equivalents thereof.

Typical systems may be grouped into two different types: 1) hardware-based systems; and 2) digital-signal-processor (DSP) based systems. In hardware-based systems, necessary functionality is usually split into suitable blocks and implemented as hardware and control of the hardware blocks is performed by a microprocessor.

In DSP-based systems, a DSP and suitable hardware accelerators are typically employed. A rationale for the DSP-based systems is a need for a DSP in an architecture of the system that is dedicated to speech processing. If GSM/EDGE modem processing is also implemented on the DSP that performs the speech processing, some resource sharing may be achieved.

Hardware-based systems typically excel at current consumption, since a processing function may usually be implemented more efficiently from a current-consumption perspective in hardware as compared to software. However, hardware-based systems tend to be inflexible and not make full use of available system resources (e.g., an audio DSP). The inflexibility is especially serious when costs and development schedules for digital application specific integrated circuits (ASICs) in modem silicon processes are taken into account.

DSP-based systems typically make better use of available system resources (e.g., an existing DSP is available) and are more flexible than hardware-based systems. From a cost perspective, most of dedicated hardware can be removed compared to a hardware-based system. The resultant cost improvement is, however, often offset by memory consumption of necessary additional DSP software relative to the hardware-based systems and, in some cases, also by still-necessary hardware accelerators. In the end, DSP-based systems are typically more costly than hardware-based systems, all other things being equal.

DSP-based systems typically consume more current, both in idle mode and dedicated mode, than comparable hardware-based systems. Moreover, software of the DSP-based systems is typically more complex than that of hardware-based systems, since tasks with different time bases must co-exist on the same DSP.

Various embodiments of the invention relate to DSP-based implementations of GSM/EDGE signal processing in which two DSP are used instead of one and in which a functionality split is made such that slot-based tasks are performed on a first DSP and frame-based tasks are performed on a second DSP. In GSM/EDGE, data output of a speech coder is encrypted, coded, and interleaved. The data is sent as bursts in time slots of 577 μs. There are 8 or 16 of these time slots per time-division multiple access (TDMA) frame. Slot-based tasks are typically considered higher priority than frame-based tasks. Therefore, if a DSP performing a frame-based task and a slot-based task needs to be performed, the frame-based task is interrupted and a context is saved. Saving the context requires memory. In addition, a more-complex software structure is necessary in order to effect necessary interrupt processes, which generally requires more memory.

A decrease in system cost may be achieved by adding a DSP due to the fact that the cost of most, if not all, realistic DSP systems is dominated by memory costs. Thus, minimizing on-chip memory often serves to reduce system costs.

FIG. 1 illustrates a dual-core (e.g., dual-DSP) system. A system 100 includes a slot DSP 102. The slot DSP 102 handles GSM/EDGE slot-based task processing (e.g., equalization). The system 100 also includes a frame DSP 104. The frame DSP 104 handles GSM/EDGE frame-based task processing (e.g., speech processing, channel encoding/decoding, interleaving/de-interleaving).

In GSM/EDGE, slot-based tasks are generally tasks that are run with a same time base as physical packets sent or received on a physical radio channel. Frame-based tasks are run on an integer number of slots. In GSM/EDGE, a typical slot-based task is equalization that is done on the physical packets sent on the physical radio channel. A typical frame-based task in GSM/EDGE is channel decoding that is done by assembling four radio bursts (sent in four slots) and then performing channel decoding.

The slot DSP 102 and the frame DSP 104 each have a slave interface and a master interface, random access memory (RAM), read-only memory (ROM), and a DSP core. The system 100 also includes a co-processor system 106. The co-processor system 106 includes hardware accelerators for signal-processing functions (if necessary) and blocks for system control.

The system 100 also includes a microcontroller 108. The microcontroller 108 runs the GSM/EDGE stack and controls the slot DSP 102 and the frame DSP 104. The system 100 also includes a direct memory access (DMA) 110 for efficient data transfers. The DMA 110 is a standalone hardware device that moves data between different memories without processor (e.g., DSP or CPU) intervention. The system 100 also includes a bus 112 for the microcontroller 108, a bus 114 for the DMA 110, and a bus 116 shared by the slot DSP 102 and the frame DSP 104. Although the slot DSP 102 and the frame DSP 104 are shown as sharing the bus 116, it will be understood by those having skill in the art that each of the slot DSP 102 and the frame DSP 104 need not necessarily share the bus 116 and may instead each have a dedicated bus. Moreover, more than two DSP may be included in the system 100 as dictated by design objectives without departing from principles of the invention.

The system 100 also includes an external memory interface (EMIF) 118 that handles external-memory accesses by the system 100. In another option, instead of external memory 120 as shown in FIG. 1, compact low-cost on-chip memory, such as embedded dynamic random-access memory (DRAM), could be used, as embedded DRAM is usually less expensive than on-chip static random-access memory (SRAM).

The DSP functional split between the slot DSP 102 and the frame DSP 104 permits all tasks on the slot DSP 102 to be run at a first rate and all tasks run on the frame DSP 104 to be run at a second rate. An execution pattern for each of the slot DSP 102 and the frame DSP 104 becomes predictable and one in which no tasks interrupt each other. Consequently, it is not necessary to have operating-system support to handle task scheduling.

The fact that tasks cannot interrupt each other means that application data memory consumption may be determined by the largest individual task. In contrast, in a system with operating-system (OS) scheduling, the application data memory consumption is generally determined by the sum of the consumption of all tasks. Moreover, software execution is predictable; therefore, each of the slot DSP 102 and the frame DSP 104 is aware of what task it will run after the present task. As a result, software of the system 100 may be stored in a cheap bulk memory, either on-chip or off-chip. For example, the external memory 120 could be located on the same chip as the slot DSP 102 and/or the frame DSP 104 or could be located externally to a chip that includes the slot DSP 102 and/or the frame DSP 104.

During execution of the present task, the DSP (e.g., the slot DSP 102) may download software for the next task to be performed by the DSP into execution memory, which process is sometimes referred to as an on-demand software download. One way of performing an on-demand software download is via the DMA 110. In addition, the slot DSP 102 and the frame DSP 104 are relatively simpler to verify, since the number of combinations of tasks decreases relative to a system in which a single DSP must perform tasks at more than one rate.

Memory consumption of the system 100 is decreased relative to a comparable single-DSP-based system. Data memory is reduced due to the fact that no tasks interrupt each other and program memory is reduced due to the ability to perform an on-demand software download. The memory reductions are typically much larger than additional costs incurred for the extra DSP (e.g., the frame DSP 104). Further, additional computational performance added by the extra DSP enables removal of hardware accelerators that would otherwise be necessary for a single-DSP system.

A dual-core system such as the system 100 is flexible due to the programmability of the slot DSP 102 and the frame DSP 104. Moreover, software of the system 100 may be primarily stored in cheap bulk memory and downloaded to execution memory just before execution, which serves to increase flexibility of the system 100 due to the fact that, in a typical prior DSP-based systems, the bulk of the system software is stored in ROM for cost reasons.

A more programmable solution typically results in an increased current consumption. However, for modem digital silicon processes, the current consumption in idle mode is dominated by leakage. The best way to combat leakage is usually to decrease the memories; therefore, a dual-DSP system such as the system 100 may use less than current than a comparable single-DSP system.

Figure 2:
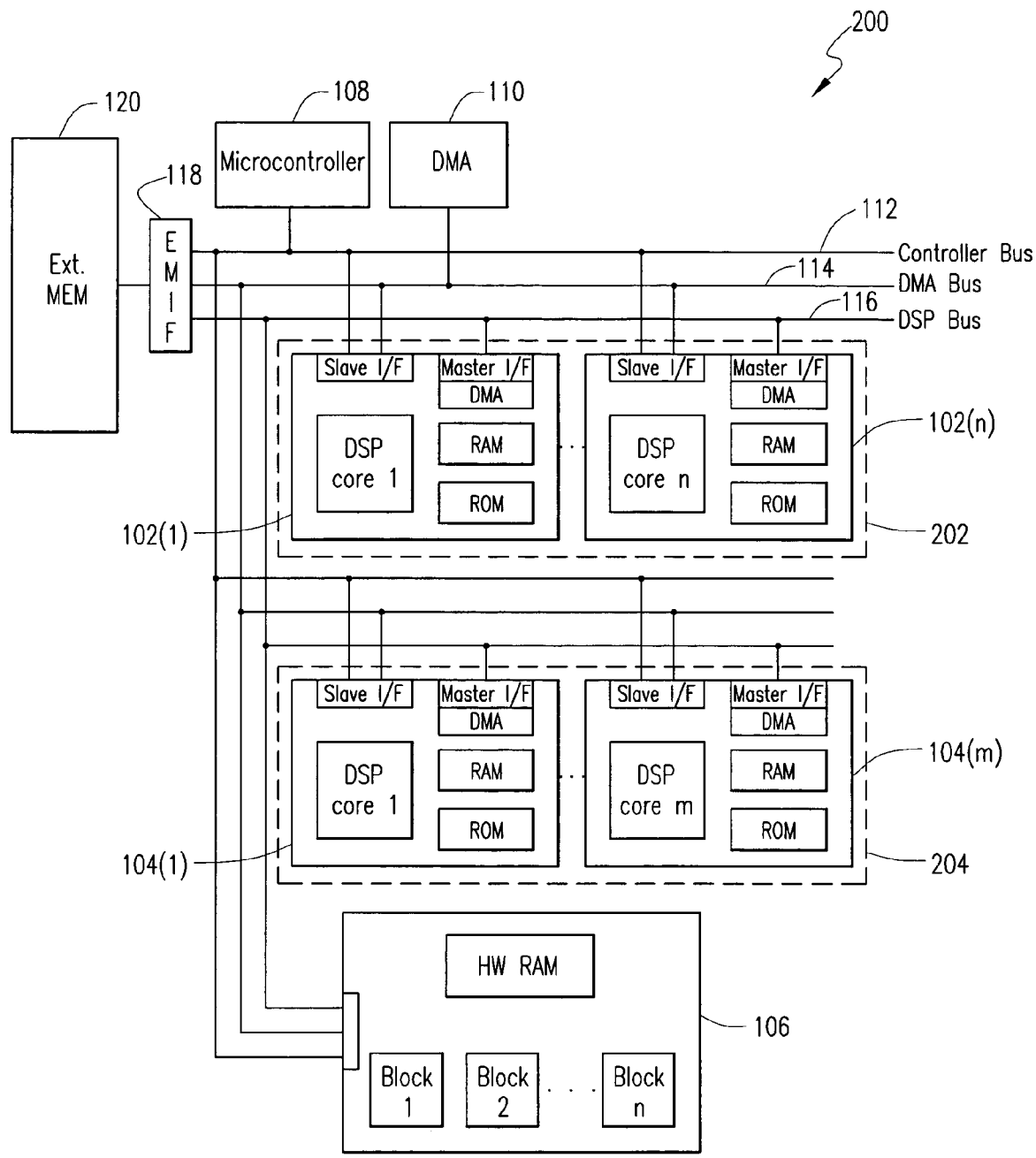
FIG. 2 is a multi-core (e.g., multiple-DSP) system in accordance with principles of the invention.

FIG. 2 illustrates a multi-core (e.g., multiple-DSP) system. A system 200 includes a slot-DSP cluster 202 and a frame-DSP cluster 204. The slot-DSP cluster 202 includes at least one of the slot DSP 102 and at least one of the frame DSP 104, a plurality of slot DSPs 102(1)-(n) and a plurality of frame DSPs 104(1)-(m) being illustrated in FIG. 2. Those having skill in the art will appreciate that n and m may each be a non-negative integer chosen in accordance with design considerations. Although each of the slot DSPs 102(1)-(n) and the frame DSPs 104(1)-(m) is indicated identically in the systems 100 and 200, those having skill in the art will appreciate that DSPs with varying characteristics can be utilized without departing from principles of the invention and that the DSPs so utilized need not all be identical to one another, either within one or both of the slot-DSP cluster 202, the frame-DSP cluster 204, or the system 100 or the system 200 as a whole.

As indicated above with respect to the system 100, the slot DSPs 102(1)-(n) serve to handle slot-based task processing, while the frame DSPs 104(1)-(m) handle frame-based task processing. In addition, in similar fashion to the system 100, the slot DSPs 102(1)-(n) and the frame DSPs 104(1)-(m) each have a slave interface and a master interface, RAM, ROM, and a DSP core. The system 200 also includes the co-processor system 106 and the microcontroller 108. The system 200 also includes the DMA 110, the bus 112, the bus 114, and the bus 116. Moreover, although the slot DSPs 102(1)-(n) and the frame DSPs 104(1)-(m) are shown as sharing the bus 116, it will be understood by those having skill in the art that each of the slot DSPs 102(1)-(n) and the frame DSPs 104(1)-(m) need not necessarily share a bus and may instead each have a dedicated bus. Furthermore, in similar fashion to the system 100, the system 200 includes the EMIF 118 as well as the external memory 120.

Those having skill in the art will appreciate that the system 200 operates in many respects in a similar fashion to that of the system 100. Thus, the discussion hereinabove relative to the system 100 and its operation is applicable to the system 200. Of course, in various embodiments of the invention, when one or both of the slot-DSP cluster 202 and the frame- DSP cluster 204 is employed, additional design considerations imposed by virtue of inclusion of a plurality of DSPs within a given cluster, such as, for example, an appropriate process for sharing the DSP bus 116, must be considered.

It should be emphasized that the terms "comprise", "comprises", and "comprising", when used herein, are taken to specify the presence of stated features, integers, steps, or components, but do not preclude the presence or addition of one or more other features, integers, steps, components or groups thereof.

The previous Detailed Description is of embodiment(s) of the invention. The scope of the invention should not necessarily be limited by this Description. The scope of the invention is instead defined by the following claims and the equivalents thereof.

What is claimed is:

1. A processing system comprising:
    a first, slot basis, digital signal processor adapted to perform tasks on a first time basis; and
    a second, frame basis, digital signal processor adapted to perform tasks on a second time basis;
    wherein the second time basis is an integer multiple of the first time basis and wherein the first time basis corresponds exclusively to a slot and the second time basis corresponds exclusively to a frame.

2. The processing system of claim 1, further comprising:
    a third digital signal processor;
    wherein the third digital signal processor is adapted to perform tasks on the first time basis; and
    wherein a first-time-basis digital-signal-processor cluster comprises the first, slot basis, digital signal processor and the third digital signal processor.

3. The processing system of claim 2, wherein tasks are performed simultaneously by the first-time-basis digital-signal-processor cluster and the second, frame basis, digital signal processor.

4. The processing system of claim 1, further comprising:
    a third digital signal processor;
    wherein the third digital signal processor is adapted to perform tasks on the second time basis; and
    wherein a second-time-basis digital-signal-processor cluster comprises the second, frame basis, digital signal processor and the third digital signal processor.

5. The processing system of claim 4, wherein tasks are performed simultaneously by the second-time-basis digital-signal-processor cluster and the first, slot basis, digital signal processor.

6. The processing system of claim 1, wherein tasks are performed simultaneously by the first, slot basis, digital signal processor and the second, frame basis, digital signal processor.

7. The processing system of claim 1, wherein the slot is 577 µs.

8. The processing system of claim 1, wherein the second, frame basis, digital signal processor performs tasks without interruption due to tasks to be performed by the first, slot basis, digital signal processor.

9. The processing system of claim 1, wherein the system operates in accordance with a GSM/EDGE standard.

10. The processing system of claim 1, wherein the system operates in accordance with a WCDMA standard.

11. The processing system of claim 1, wherein the system operates in accordance with a PDC standard.

12. The processing system of claim 1, wherein the system operates in accordance with a TDMA standard.

13. The processing system of claim 1, wherein the system operates in accordance with an IS-95 standard.

14. The processing system of claim 1, wherein the system operates in accordance with a CDMA 2000 standard.

15. The processing system of claim 1, wherein the first, slot basis, digital signal processor and the second, frame basis, digital signal processor share a bus.

16. The processing system of claim 1, wherein each of the first, slot basis, digital signal processor and the second, frame basis, digital signal processor has a dedicated bus.

17. In a system comprising a plurality of digital signal processors, a processing method comprising:
    performing, by a first, slot basis, digital signal processor, of tasks on a first time basis;
    performing, by a second, frame basis, digital signal processor, of tasks on a second time basis;
    and
    wherein the second time basis is an integer multiple of the first time basis and the first time basis correspond exclusively to a slot and the second time basis corresponds exclusively to a frame.

18. The method of claim 17, further comprising:
    wherein a first-time-basis digital-signal-processor cluster comprises the first, slot basis, digital signal processor and a third digital signal processor; and
    performing, by the third digital signal processor, of tasks on the first time basis.

19. The method of claim 18, wherein tasks are performed simultaneously by the first-time-basis digital-signal-processor cluster and the second, frame basis, digital signal processor.

20. The method of claim 17, further comprising:
    wherein a second-time-basis digital-signal-processor cluster comprises the second, frame basis, digital signal processor and a third digital signal processor; and
    performing, by the third digital signal processor, of tasks on the second time basis.

21. The method of claim 20, wherein tasks are performed simultaneously by the second-time-basis digital-signal-processor cluster and the first, slot basis, digital signal processor.

22. The method of claim 17, wherein tasks are performed simultaneously by the first, slot basis, digital signal processor and the second, frame basis, digital signal processor.

23. The method of claim 17, wherein the slot is 577 µs.

24. The method of claim 17, wherein the second, frame basis, digital signal processor performs tasks without interruption due to tasks to be performed by the first, slot basis, digital signal processor.

25. The method of claim 17, wherein the method operates in accordance with a GSM/EDGE standard.

26. The method of claim 17, wherein the method operates in accordance with a WCDMA standard.

27. The method of claim 17, wherein the method operates in accordance with a TDMA standard.

28. The method of claim 17, wherein the method operates in accordance with an IS-95 standard.

29. The method of claim 17, wherein the method operates in accordance with a CDMA 2000 standard.

30. The method of claim 17, wherein the first, slot basis, digital signal processor and the second, frame basis, digital signal processor share a bus.

31. The method of claim 17, wherein the first, slot basis, digital signal processor and the second, frame basis, digital signal processor has a dedicated bus.

* * * * *